United States Patent [19]
Favre et al.

[11] Patent Number: 5,181,380
[45] Date of Patent: Jan. 26, 1993

[54] HYDROSTATIC OPERATING MODE HYDRAULIC ACTUATOR PREFERABLY FOR BACKUP OPERATION, AND FLIGHT CONTROL SYSTEM COMPRISING IT

[75] Inventors: Christian Favre, Tournefeuille; Dominique Van den Bossche, Rieumes, both of France

[73] Assignee: Aerospatial Societe Nationale Industrielle, Paris, France

[21] Appl. No.: 762,561

[22] Filed: Sep. 18, 1991

[30] Foreign Application Priority Data

Sep. 19, 1990 [FR] France ................... 90 11538

[51] Int. Cl.⁵ .............................................. F16D 31/02
[52] U.S. Cl. ........................................ 60/405; 60/421; 60/464; 60/478
[58] Field of Search ............... 60/405, 421, 428, 429, 60/462, 473, 476, 475, 478, 464; 91/509; 244/78, 226, 227

[56] References Cited

U.S. PATENT DOCUMENTS

| | | |
|---|---|---|
| 2,921,562 | 1/1960 | Westbury et al. ............... 244/227 |
| 2,956,408 | 10/1960 | Fowler ............................. 60/428 |
| 3,902,318 | 9/1975 | Becker et al. |
| 4,905,933 | 3/1990 | Ako. |
| 5,072,584 | 12/1991 | Mauch et al. .................... 60/464 |

FOREIGN PATENT DOCUMENTS

2603865 9/1987 France.
2053419 2/1981 United Kingdom.

*Primary Examiner*—Edward K. Look
*Assistant Examiner*—F. Daniel Lopez
*Attorney, Agent, or Firm*—Remy J. VanOphem

[57] ABSTRACT

An hydraulic actuator composed of a double-acting actuator, a mobile switching member disposed in a housing connected hydraulically to the actuator, two fluid inlet and outlet pipes and a control member adapted to command the mobile switching member to move between a neutral configuration and an active service configuration. A variable speed pump system is connected to the housing by an auxiliary circuit; the mobile switching member has an active second configuration in which the actuator communicates with the auxiliary circuits, whereby the actuator, the pump system and the auxiliary circuit constitute a hydrostatic transmission.

12 Claims, 5 Drawing Sheets

HYDROSTATIC OPERATING MODE HYDRAULIC ACTUATOR PREFERABLY FOR BACKUP OPERATION, AND FLIGHT CONTROL SYSTEM COMPRISING IT

BACKGROUND OF THE INVENTION

The invention concerns a highly reliable hydraulic actuator designed in particular but not exclusively for operating mechanical parts of aircraft such as control surfaces, ailerons or deflectors within a flight control system or even aircraft front wheel steering systems.

In known flight control systems, reliability requirements applying to civil aircraft in particular make it necessary to provide multiple (in practice three) hydraulic circuits to hydraulic actuators with at least one able to take over from another should the latter fail. This redundancy is reflected in a significant increase in weight and overall size; in practice, there is the additional requirement to achieve high reliability for each circuit.

An object of the invention is to alleviate the aforementioned drawbacks by making it possible to reduce the number of hydraulic circuits needed, without reducing the level of reliability, by combining with at least one electro-hydraulic servocontrol unit a local pump system specific to that servocontrol unit or adapted to cooperate with multiple adjacent servocontrol units, designed to operate only in an emergency and operating on a limited volume of fluid, preferably contained for the most part in the servocontrol unit in question, sourced from the main hydraulic circuit, possibly through valves.

More generally, the invention is directed to being able to operate on a double-acting actuator system (either a double-acting actuator or opposed single-acting actuators), of the linear of rotary type, at will, hydraulically or hydrostatically, the hydraulic mode being preferably, but not necessarily, a normal mode.

The invention, therefore, proposes an hydraulic actuator composed of at least one double-acting actuator system, a mobile switching member disposed in a housing connected hydraulically to the actuator system and via an hydraulic distribution unit to fluid inlet and outlet pipes incorporating isolating valves, a fluid reserve connected to the outlet pipe, and a control member adapted to command the mobile switching member to move between a neutral configuration in which the actuator system is isolated hydraulically from the hydraulic distribution unit and an active service configuration in which the actuator system communicates with the hydraulic distribution unit, characterized in that it further includes a variable speed controlled pump system connected by an auxiliary branch circuit to the housing of the mobile switching member and to the fluid reserve, the mobile switching member having three positions and being provided with additional control means adapted to command the mobile switching member to move between the neutral configuration and an active second configuration in which the actuator system communicates with the auxiliary circuit, whereby the actuator system, the pump system and the auxiliary circuit constitute a hydrostatic transmission.

It will be understood that a pump system of this kind (which may have a backup function), provided that appropriate hydraulic connections are provided (which is within the competence of one skilled in the art), may control multiple systems of actuators through associated mobile switching members, the control of each actuator system being individualized by selectively acting on the associated mobile member.

SUMMARY OF THE INVENTION

According to advantageous features of the invention, the pump system is specific to the actuator system, and the pump system may be part of an auxiliary module mounted to a base module including the actuator system, the mobile switching member, the hydraulic distribution unit, the control member of the mobile switching member, the fluid reserve and the fluid inlet and outlet pipes.

The pump system includes a bypass adapted to short-circuit the actuator system in the neutral configuration of the mobile switching member, and a restriction is provided in the bypass.

The mobile switching member is a linear displacement slide valve and the hydraulic distribution unit is a servovalve.

The control member is a solenoid valve connected to the fluid inlet and outlet pipes and to one end of the housing of the mobile switching member, and an additional control means, separate from the control member, is electromagnetically controlled and is adapted to operate on the slide valve in the opposite direction to that in which the control member operates.

The pump system is an electric motor driving a bidirectional hydraulic pump connected to a drain pipe connected to a fluid reservoir and to two suction and discharge pipes connected to the housing of the slide valve. The suction and discharge pipes incorporate a double valve controlled by the pressures in the pipes, allowing an obstruction neutral configuration and two end positions in which the suction and discharge pipes are placed in communication with the chambers of the actuator system via the mobile switching member when the latter is in its active second configuration.

The invention also proposes an application of the actuator in which use of the pump system is reserved to an emergency operating mode.

The invention further proposes a flight control system for an aircraft incorporating control surfaces for controlling the aircraft in roll, pitch and yaw, respectively, having independent centralized hydraulic circuits, an electrical power supply system and actuators for maneuvering respective sets of control surfaces, characterized in that at least one of the actuators constitutes an actuator unit, a servocontrol unit connected to one of the centralized hydraulic circuits and, in parallel with the servocontrol unit, a hydrostatic module having an electrically powered pump system and a selector element adapted to control the actuator member either via the servocontrol unit or via the hydrostatic module, the hydrostatic module being connected to an electrical power supply.

Preferably the system has, in parallel with the actuator constituting a servocontrol unit and a hydrostatic module, another servocontrol unit connected to another of the hydraulic circuits.

The electrical power supply is part of the electrical system of the aircraft, or conversely, the electrical power supply is independent of the electrical system of the aircraft, and the actuator is connected to control means independent of the electrical system of the aircraft.

The control surfaces constitute two ailerons each operated by an actuator composed of a servocontrol unit and a hydrostatic module. Each of the ailerons is further operated by a servocontrol unit which includes two independent centralized hydraulic circuits, each pressurized by a respective engine of the aircraft and an independent centralized third hydraulic circuit pressurized by an electric pump connected to the electrical system of the aircraft, situated at the aft end of the aircraft. All of the actuators situated in the proximity of the wings of the aircraft are connected to one of the other of the hydraulic circuits pressurized by the aircraft engines.

It will be understood that the actuator allows considerable component standardization, the servocontrol module being of the same design irrespective of its further application. If no standby auxiliary module is needed, it is sufficient to close off the relevant pipes.

Objects, features and advantages of the invention will emerge from the following description given by way of non-limiting example with reference to the appended drawings.

DETAILED DESCRIPTION OF THE PREFERRED EMBODIMENT

Figure 1:
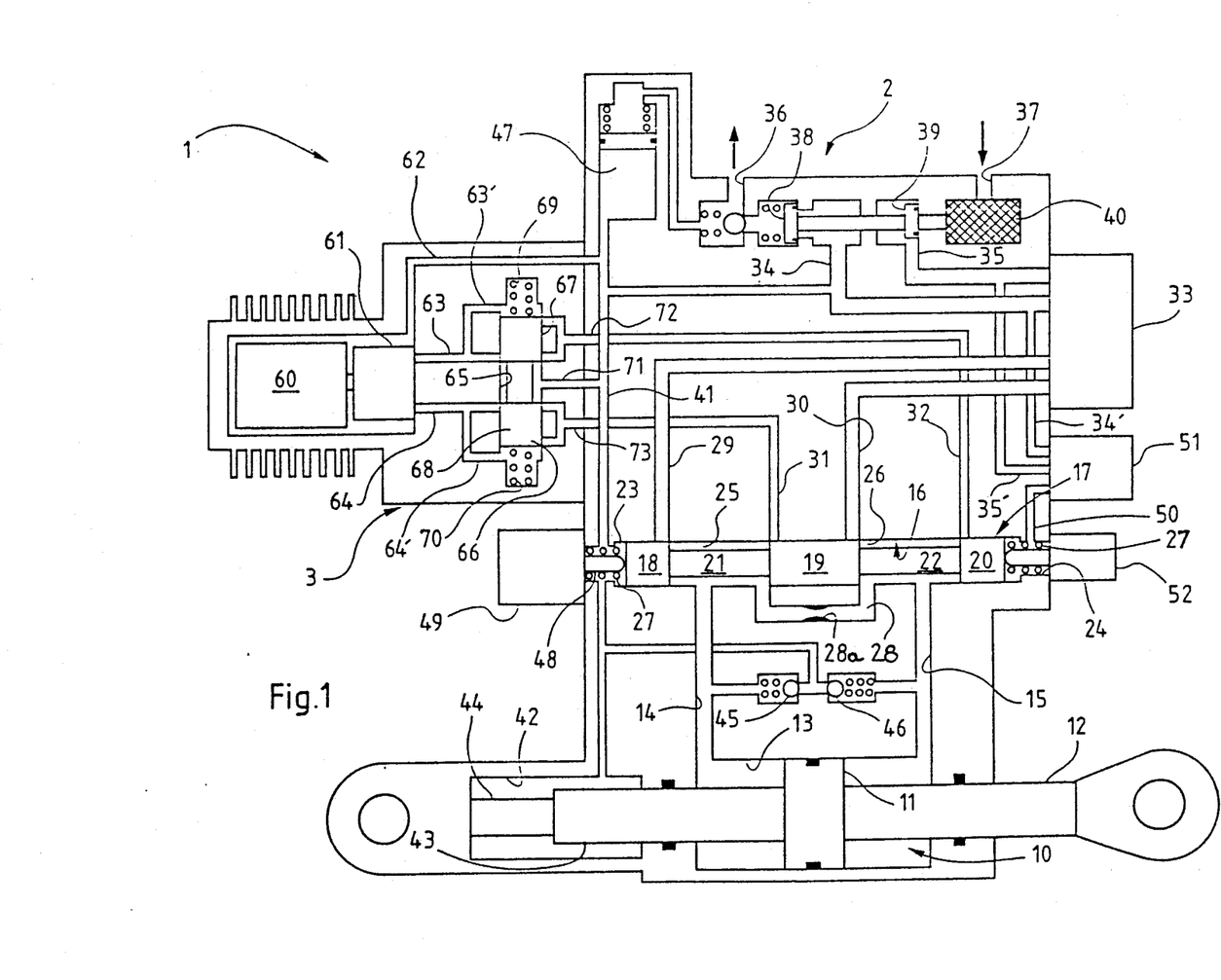
FIG. 1 is a simplified plan view of an actuator in accordance with the invention in a neutral service configuration.
Figure 2:
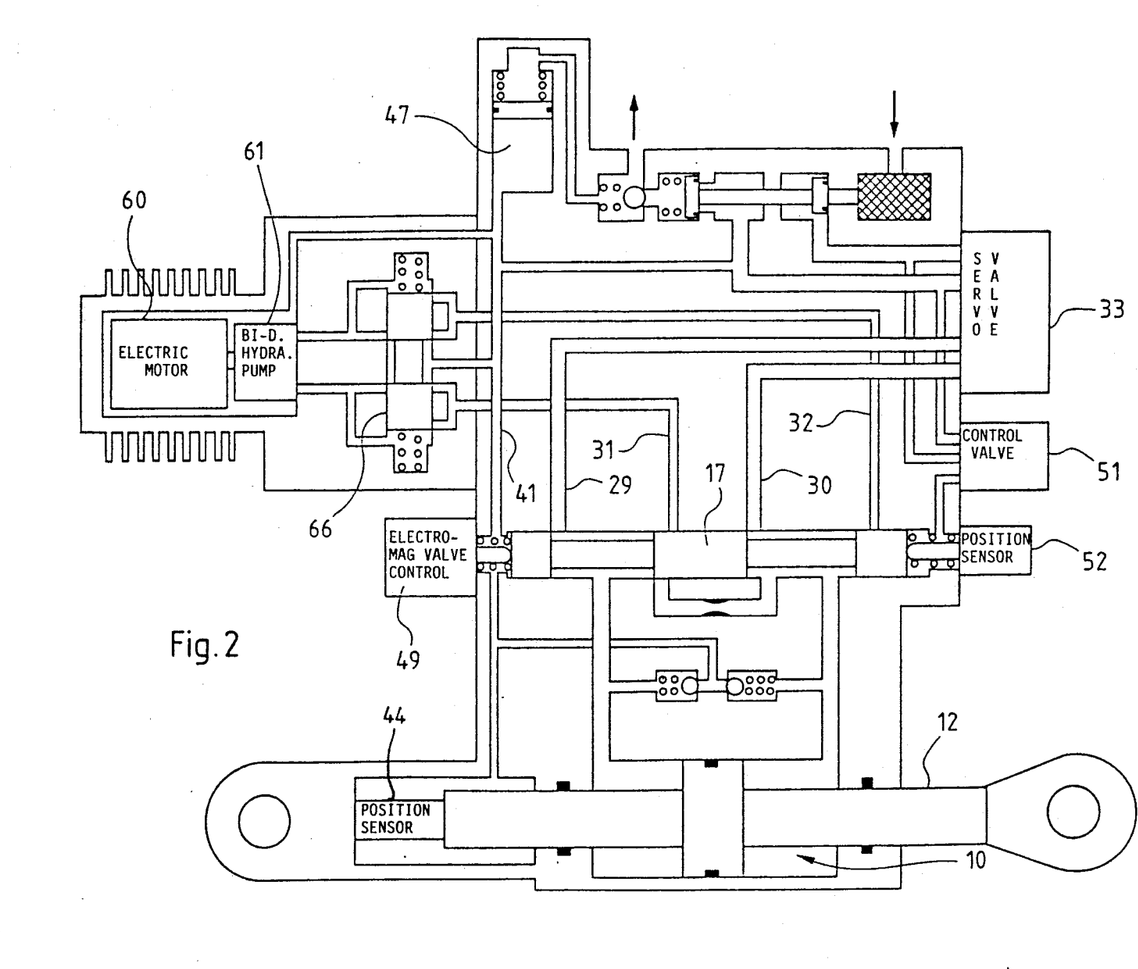
FIG. 2 is a similar view of the actuator in an active service configuration.
Figure 3:
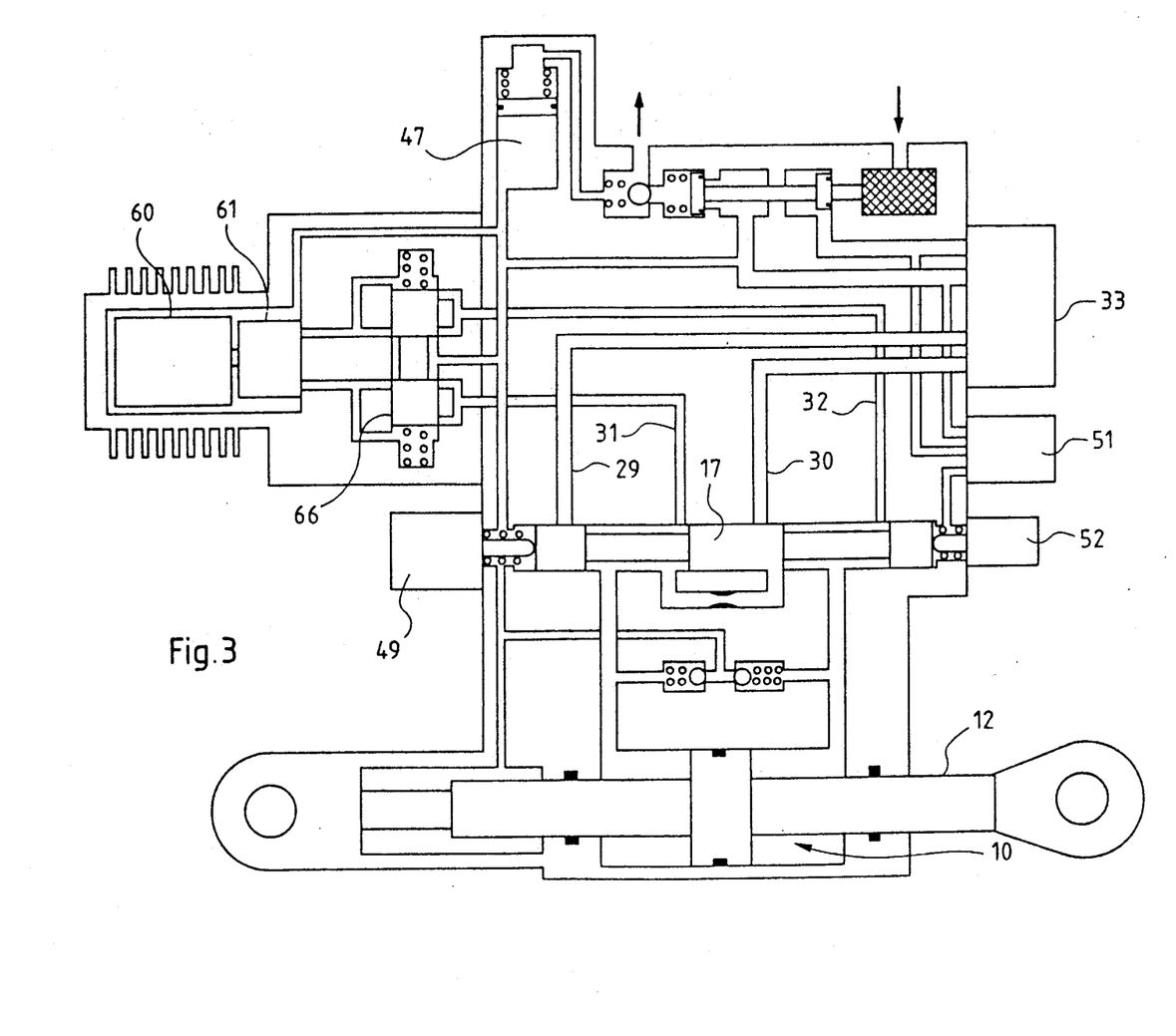
FIG. 3 is another similar view of the actuator in a standby configuration.

FIGS. 1 through 3 show an hydraulic actuator 1 with electrical backup in accordance with the invention.

The actuator 1 has an autonomous main hydraulic servocontrol module 2 and an auxiliary backup electrohydrostatic module 3.

The main module 2 constitutes a double-acting piston-and-cylinder actuator 10 having a piston 11 whose piston rod 12 controls the position of an external member (not shown). The piston 10 slides in a cylinder 13 connected at its ends to fluid pipes 14 and 15 which open into the housing 16 of a three-position mobile switching member in the form of a slide valve 17.

The slide valve 17 includes three bodies 18 through 20 joined by rods 21 and 22 sliding in a fluid-tight way in the housing 16 in which they define four chambers 23 through 26, namely first and second end chambers 23 and 24 and first and second intermediate chambers 25 and 26.

The end chambers 23 and 24 contain spring return members (in this example springs 27 and 27a loaded in compression) jointly acting to maintain the slide valve 17 in a neutral median configuration.

A short-circuit or bypass pipe 28 opening into the housing 16 of the slide valve establishes communication between the intermediate chambers when the slide valve is in the neutral median configuration; the outlets of this pipe are therefore spaced by a distance substantially equal to the axial dimension of the central body 19.

The bypass pipe 28 advantageously includes a restriction 28a designed to slow down the flow of fluid between the intermediate chambers 25 and 26, and therefore between the chambers of the actuator 10, so that the actuator acts as a damper. This dampening effect can also be obtained by choosing a reduced flow cross section for one of the orifices through which the bypass pipe 28 communicates with the housing 16.

Two pairs of pipes 29 and 30, 31 and 32 also discharge into the housing 16, their outlets being closed by the slide valve in its idle configuration. The pipes 29 and 30 of one pair are respectively closed off by the central body 19 and one of the end bodies 18 and the pipes 31 and 32 of the other pair are closed off by the central body and the other end body 20. The outlets of the pipes of each pair are spaced by an axial distance equal to the sum of the axial dimensions of the central body 19 and one of the associated intermediate chambers 25 or 26, whereby displacement of the slide valve in either direction opens simultaneously the pipes of one pair while maintaining closed the pipes of the other pair.

One pair of pipes 29 and 30 leads to a servovalve 33 to which fluid inlet and outlet pipes 34 and 35 are lead. The servovalve determines which pipe of the pair is placed in communication with the fluid inlet, the other pipe being placed in communication with the fluid outlet.

The pipes 34 and 35 discharge outside the main module through orifices 36 and 37 adapted to be connected to external lines (not shown).

A pair of isolating valves 38 and 39 is advantageously disposed in the pipes 34 and 35 so as to shut them off unless sufficient feed pressure is present at the orifice 37. A filter element 40 is advantageously disposed in the fluid inlet pipe 35.

An auxiliary exhaust or leak pipe 41 discharges into the fluid outlet pipe 34. It communicates with the end chamber 23 of the housing 16 of the slide valve 17 and a chamber 42 accommodating an extension 43 of the piston rod 12.

In the chamber 42 is a sensor 44 adapted to sense the instantaneous position of the piston 11.

The auxiliary exhaust pipe 41 also communicates with the pipes 14 and 15 through non-return valves 45 and 46, respectively.

The auxiliary exhaust pipe 41 advantageously communicates with an accumulator 47 containing a reserve of fluid designed to compensate for variations in the volume of the hydraulic fluid as a result of thermal expansion. In practice the accumulator contributes to maintaining the fluid in the actuator under pressure.

A finger 48 of an additional slide valve control member 49, in this example an electromagnetic type device, enters the end chamber 23 of the housing of the slide valve 17 axially. The other end chamber 24 communicates through a control pipe 50 with a control member 51, in this example a solenoid valve, to which are also connected branch pipes 34' and 35' from the fluid inlet and outlet pipes 34 and 35.

A position sensor 52 adapted to sense the instantaneous position of the slide valve extends into the end chamber 24.

The auxiliary backup electro-hydrostatic module 23 includes an electric motor 60, preferably a brushless DC motor, and associated electronic switching equipment (not shown).

The motor 60 drives a bidirectional hydraulic pump 61 provided with a drain pipe 62 and two suction or discharge pipes 63 and 64. These suction or discharge pipes terminate in the housing 65 of a double sliding valve 66 composed of two valve bodies 67 and 68 fastened together and normally closing the discharge pipes 63 and 64. The ends of the housing 65 are connected to control pipes 63' and 64' communicating with the discharge pipes. Spring return members 69 and 70 urge the double sliding valve 66 towards a neutral median configuration.

The housing 65 of the double sliding valve 66 is connected to a median pipe 71 and two pairs of pipe sections each connected to a common communication pipe 72 and 73. The pipe sections of each pair are so positioned and spaced that, in the neutral configuration of the double sliding valve 66, they are all closed off by one of the valve bodies 67 or 68 but, immediately when the double sliding valve 66 is moved in either direction, the outlet pipe 63 or 64 in which the pressure is higher communicates with one of the communication pipes 72 or 73 while the other of these pipes communicates with the other communication pipe and with the median pipe 71.

The auxiliary backup electro-hydrostatic module is mounted to the main module 2 by any appropriate known means (not shown) so that the median pipe 71 is placed in communication with the fluid reserve 47, in this example through the auxiliary pipe 41, while the communication pipes 72 and 73 connected to the pipes 31 and 32, respectively, discharge into the housing 16 of the distributor slide valve 17.

When neither the "normal" mode nor the "standby" mode is actuated, the slide valve 17 remains in its neutral configuration (FIG. 1). As explained above, the pipe 28 damps unwanted variations in the position of the actuator piston 11.

In the "normal" operating mode, the solenoid valve 51 is actuated so as to move the slide valve towards the FIG. 2 configuration. The position of the servovalve 33 then determines which side of the piston 11 is acted on by the pressure in the pipe 35, to either retract or deploy the piston rod 12.

In the "standby" operating mode, in the event of a failure in the hydraulic supply of the main module 2 or in the control system of its electrical components, the electromagnetic control valve member 49 is actuated so as to move the slide valve 17 into the FIG. 3 configuration and the motor 60 pumps fluid into whichever of the suction/discharge pipes 63 or 64 communicates with the chamber of the actuator 10 that is to be pressurized.

Figure 4:
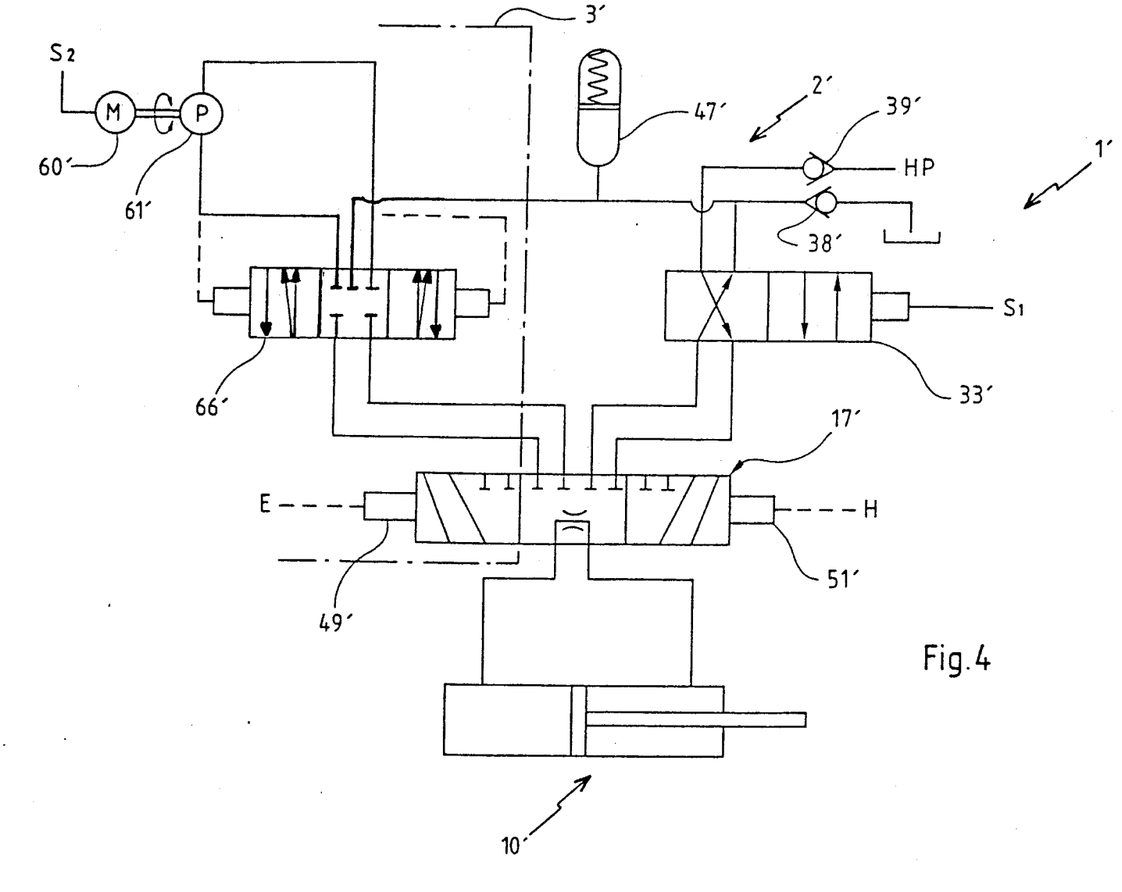
FIG. 4 is an hydraulic schematic of the actuator.

The general hydraulic structure of the actuator system 1 is schematically represented in FIG. 4 in which the main components defined with reference to FIG. 1 are identified by the same reference numbers "primed".

The diagram shows an actuator 10', a three-position switching mobile member 17', an hydraulic distribution member 33' preferably offering progressive control connected to an exterior hydraulic circuit through isolating valves 38' and 39' and determining via the slide valve 17' the distribution of pressure in the actuator 10', a fluid reserve 47', a control member 51' adapted to control the slide valve 17' in two of its positions, an electrically controlled variable speed pump system including a motor 60' and a pump 61' determining with the valve 66' the pressure conditions in the actuator 10', and an auxiliary slide valve control member 49' adapted to move the slide valve into its third position, establishing hydraulic communication between the pump system and the actuator which thus constitutes a hydrostatic transmission. The actuator operates in normal mode (signal $S_1$ applied to the distribution member 33' and signal H applied to the control member 51' operating hydraulically on the slide valve 17') or in backup mode (speed signal $S_2$ applied to the motor 60' and signal E applied to the control member 49').

It goes without saying that the foregoing description has been given by way of non-limiting example only and that numerous variants may be proposed by one skilled in the art without departing from the scope of the invention. In particular, the actuator (or set of opposed actuators) can be a linear or rotary actuator; the slide valve 17 can be replaced by any appropriate known type rotary mobile member and the control members 49' and 51' can in any appropriate known way be combined in a single control device for the mobile switching member.

It will be understood that, being provided for emergency use only in this example, the auxiliary backup electro-hydrostatic module 3 is, when integrated into an aircraft flight control system, subject to reliability requirements compatible with low weight and compact overall dimensions; this is because the module need only carry out light duty cycles (limited speed of operation, comparable with that accepted in the case of double hydraulic failure on known aircraft; no exceptional flight conditions to be catered for; short operating life in comparison with service life of the aircraft; sealing requirements limited to the duration of one flight, etc.).

Figure 5:
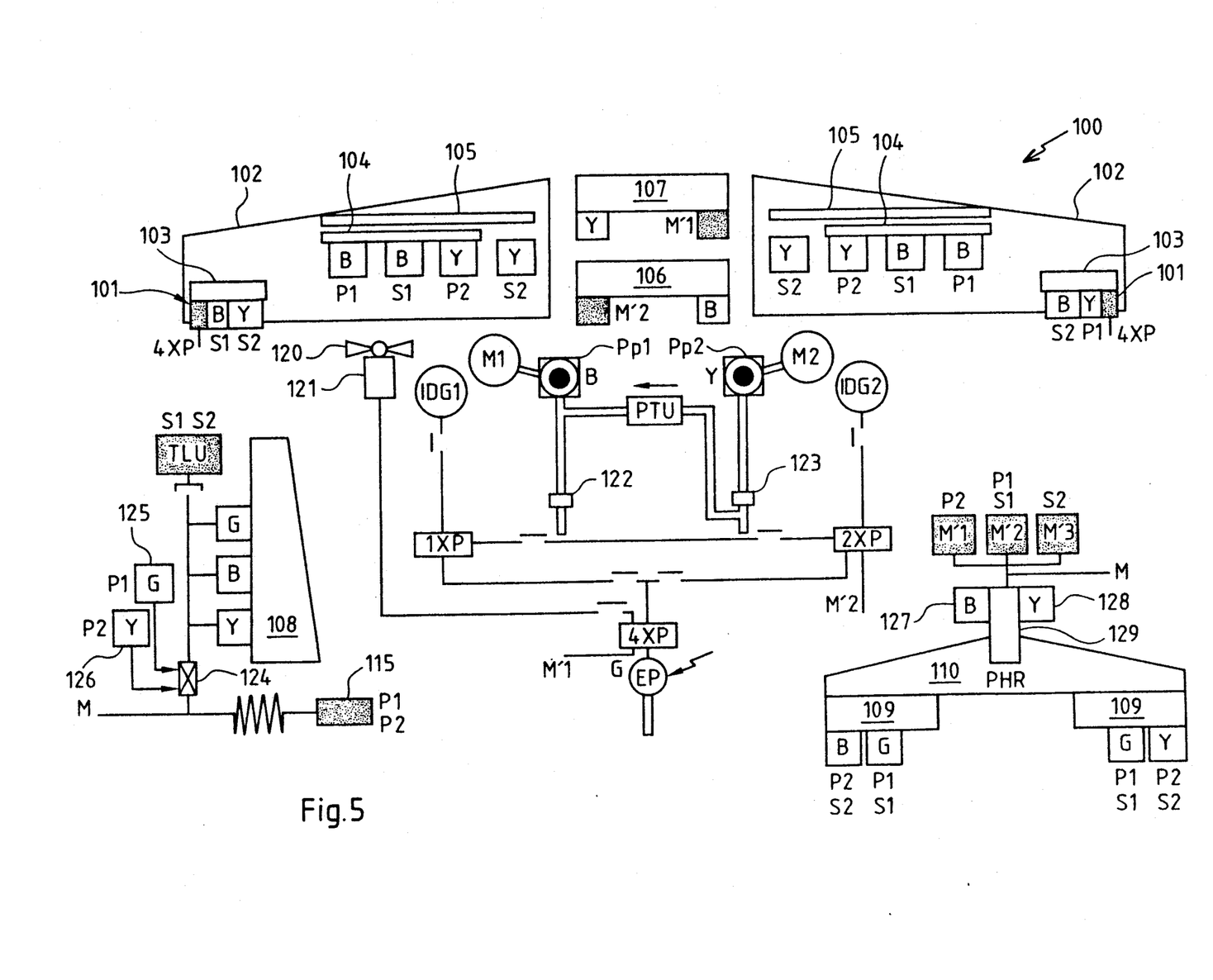
FIG. 5 is a diagram of a flight control system incorporating actuators of the type shown in FIGS. 1 through 4.

FIG. 5 shows a flight control system 100 that is novel in that it includes electrical backup hydraulic actuators 101 of the same or equivalent design to the actuators 1 or 1' from FIGS. 1 through 4, in the sense that they can respond to hydraulic or electrical power.

FIG. 5 includes a schematic representation, in an arrangement that is conventional in this art, of two aircraft wings 102 with ailerons 103 and spoilers 104 and 105 for roll control, air-brakes and lift reduction, leading edge flaps 107 and trailing edge flaps 106, a directional control surface 108, trimmable horizontal stabilizers (THS) 109 articulated to a horizontal tailplane 110 with a variable angle of incidence relative to the aircraft fuselage, and two engines M1 and M2.

The various control surfaces 103 through 110 mentioned above are operated by actuators schematically represented as rectangles, there being in practice at least two actuators per control surface (or group of surfaces).

Some rectangles contain the letter B, Y or G. These rectangles represent conventional hydraulic servocontrol units and the letter B, Y or G in the rectangle identifies which of the three centralized hydraulic circuits the servocontrol unit in question is connected to. By convention, these three circuits are denoted Blue, hence the letter B, Yellow, hence the letter Y and Green, hence the letter G.

Other rectangles are shaded and represent electric actuators. This applies to the three electric motors M'1, M'2 and M'3 of the electrical part of the actuators 101, a directional trim actuator 115 and a variable travel limitation unit (TLU) associated with the directional control surface 108.

Electrical power can be supplied by integrated drive generators IDG1 and IDG2 or if necessary by an alternator 120 driven by a retractable windmill 121 which can be deployed to project from the fuselage as needed.

The AC electrical supply busbars 1XP, 2XP and 4XP are respectively supplied with power by the generators IDG1, IDGE2 and 121 and the various electrical equipments (electric motors, electric pump, etc.) are connected to them.

The Power Transfer Unit (PTU) pressurizes the circuit B if the engine M1 stops.

Priority valves 122 and 123 are respectively disposed on the circuits B and Y to give priority to controlling the so-called flight controls in the event of a temporary decrease in pressure.

The directional control surface 108 is actuated by three mechanical input servocontrol units operating in parallel. The control surface 108 receives a mechanical command signal M from the rubber bar (not shown) with which is combined (at 124) an electrical command signal transmitted by two yaw damper servocontrol units 125 and 126.

The PHR 110 is operated by two hydraulic actuators 127 and 128 controlling the position of the PHR through a differential unit 129. The PHR is controlled by an electrical command signal transmitted by the motors M'1, M'2 and M'3. It can also receive a mechanical command signal M' transmitted by cable from the trim wheel on the flight deck. This mechanical command signal has priority: the electric motors are disengaged if the mechanical control is operated.

Alongside most of the rectangles representing an actuator is an indication of the main computer (P1, P2) or secondary computer (S1, S2) controlling operation of the actuator. When two computers are shown for the same actuator, this means that the second computer (that to the right or below the other computer) takes over from the first should it fail.

The various control surfaces are operated by a plurality of actuators connected to different power sources.

For example, the spoilers 104 and 105 are operated by conventional servocontrol units connected to the circuits B or Y.

The ailerons 103 are each operated by a conventional servocontrol unit connected to one circuit Y or B and an electrical backup hydraulic actuator 101 connected to the other circuit Y or B and to an electrical power source, in this example the bushbar 4XP.

The actuator 101 can therefore, if required, receive electrical power from the alternator associated with the windmill.

The leading edge flaps 107 are operated by a conventional servocontrol unit connected to the Y circuit and to the motor M'1.

The flaps 106 are operated by a conventional servocontrol unit connected to the circuit B (the wingtip flaps and the flaps are therefore operated by servocontrol units connected to different circuits) and to the motor M'2.

The directional control surface is operated by three servocontrol units each connected to a respective one of the circuits Y, B and G and the actuators 125 and 126 are connected to the circuits Y and G.

The trimmable horizontal stabilizers 109 are operated by servocontrol units connected on the right-hand side to the circuits G and Y and on the left-hand side to the circuits B and G. The actuators 127 and 128 are connected to the circuits B and Y.

It will be understood that in the example shown all of the actuators connected to the circuit G, that is to say to the circuit pressurized by the electric pump, are at the aft end of the aircraft. The centralized hydraulic circuit G may therefore be a highly localized circuit of much smaller extent than the circuits Y and B at the aft end of the aircraft.

It goes without saying that the foregoing description has been given by way of non-limiting example only and that numerous variants may be proposed by one skilled in the art without departing from the scope of the invention.

For example, in the example discussed above, the hydrostatic part of the actuators 101 is energized by the electrical system of the aircraft (1XP, 2XP, 4XP) but as an alternative to this (not shown), these hydrostatic parts may be integrated into standby subsystems that are totally independent of the aforementioned electrical system and possibly independent also of the processing system constituted by a set of four computers P1, P2, S1 and S2. Electrical power can be supplied, for example, by a standby generator powered from one or other of the circuits Y or B and the command signals can be transmitted from the control column and the rubber bar by an electrical or optical system independent of the main system.

Also, although the flight control system described above by way of example provides an electrical backup hydraulic actuator for each aileron, the invention also encompasses the case where the actuators are assigned to any one or more degrees of freedom of the aircraft.

What is claimed is:

1. A hydraulic actuator system having a fluid inlet and fluid outlet, said hydraulic actuator system comprising:
    at least one actuation means;
    a housing hydraulically connected to said at least one actuation means, said housing containing a mobile switching member;
    a hydraulic distribution unit hydraulically connected to said fluid inlet and outlet for regulating flow from said fluid inlet to said mobile switching member;
    first control means for moving said mobile switching member between a neutral configuration in which said at least one actuation means is hydraulically isolated from said hydraulic distribution unit and a first active service configuration in which said at least one actuation means fluidically communicates with said hydraulic distribution unit;
    pumping means fluidically connected to said mobile switching member; and
    second control means for moving said mobile switching member between said neutral configuration and a second active service configuration in which said at least one actuation means fluidically communicates with said pumping means;
    whereby said at least one actuation means and said pumping means define a hydrostatic transmission.

2. A hydraulic actuator system according to claim 1 wherein said pumping means is dedicated to said at least one actuation means.

3. A hydraulic actuator system according to claim 1 wherein said pumping means comprises an auxiliary module mounted to said housing and mounted to said at least one actuation means, said mobile switching member, said hydraulic distribution unit, and said first and second control means.

4. A hydraulic actuator system according to claim 1 further comprising bypass means fluidically connected to said mobile switching member such that said at least one actuation means is short-circuited when said mobile switching member is in said neutral configuration.

5. A hydraulic actuator system according to claim 4 wherein a restriction is provided in said bypass means.

6. A hydraulic actuator system according to claim 1 wherein said hydraulic distribution unit is a servovalve.

7. A hydraulic actuator system according to claim 1 wherein said first control means is a solenoid valve fluidically connected to said fluid inlet and outlet and mounted to said housing.

8. A hydraulic actuator system according to claim 1 wherein said second control means operates electromagnetically to move said mobile switching member in a direction opposite to that in which said first control means moves said mobile switching member.

9. A hydraulic actuator system according to claim 1 wherein said pumping means comprises:
an electric motor;
a bidirectional hydraulic pump driven by said electric motor and fluidically connected to a suction pipe and a discharge pipe, said suction and discharge pipes being fluidically connected to said movable switching member.

10. A hydraulic actuator system according to claim 9 further comprising a double valve fluidically connected to said suction and discharge pipes so as to be controlled by pressure in said suction and discharge pipes, said double valve having a neutral configuration and two oppositely disposed end positions in which said suction and discharge pipes are in fluidic communication with said at least one actuation means via said mobile switching member when said mobile switching member is in said second active service configuration.

11. A hydraulic actuator system according to claim 1 wherein said first control means moves said mobile switching member during a normal operation mode between said neutral configuration and said first active service configuration, and wherein said second control means in an emergency operation mode moves said mobile switching member between said neutral configuration and said second service configuration.

12. A hydraulic actuator system according to claim 1 wherein said mobile switching member is a linear displacement slide valve.

* * * * *

UNITED STATES PATENT AND TRADEMARK OFFICE
CERTIFICATE OF CORRECTION

PATENT NO. : 5,181,380
DATED : January 26, 1993
INVENTOR(S) : Favre et al

It is certified that error appears in the above-identified patent and that said Letters Patent is hereby corrected as shown below:

Column 1, line 35, delete "of" second occurrence and insert ---- or ----.

Column 4, line 23, delete "are" and insert ---- also ----.

Column 9, line 18, delete "movable" and insert ---- mobile ----.

Column 10, line 2, delete "pressure" and insert ---- pressures ----.

Signed and Sealed this

Thirtieth Day of November, 1993

Attest:

BRUCE LEHMAN

Attesting Officer

Commissioner of Patents and Trademarks